(12) United States Patent
Bertin-Mourot et al.

(10) Patent No.: US 12,330,409 B2
(45) Date of Patent: Jun. 17, 2025

(54) FENESTRATION ASSEMBLIES AND RELATED METHODS

(71) Applicant: Corning Incorporated, Corning, NY (US)

(72) Inventors: Thomas Bertin-Mourot, Paris (FR); Anthony Robert Board, Breesport, NY (US); James Gregory Couillard, Ithaca, NY (US); Michael Aaron McDonald, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 95 days.

(21) Appl. No.: 17/767,084

(22) PCT Filed: Oct. 20, 2020

(86) PCT No.: PCT/US2020/056433
§ 371 (c)(1),
(2) Date: Apr. 7, 2022

(87) PCT Pub. No.: WO2021/080952
PCT Pub. Date: Apr. 29, 2021

(65) Prior Publication Data
US 2022/0363033 A1 Nov. 17, 2022

Related U.S. Application Data

(60) Provisional application No. 62/923,690, filed on Oct. 21, 2019.

(51) Int. Cl.
*B32B 7/05* (2019.01)
*B32B 3/08* (2006.01)
(Continued)

(52) U.S. Cl.
CPC ............... *B32B 7/05* (2019.01); *B32B 3/085* (2013.01); *B32B 17/10* (2013.01); *B32B 27/00* (2013.01);
(Continued)

(58) Field of Classification Search
CPC ....... E06B 3/6707; E06B 3/6715; B32B 7/05; B32B 3/085; B32B 17/10; B32B 27/00;
(Continued)

(56) References Cited

U.S. PATENT DOCUMENTS

| | | |
|---|---|---|
| H975 H | 11/1991 | Selkowitz et al. |
| 9,925,743 B2 | 3/2018 | Fisher et al. |

(Continued)

FOREIGN PATENT DOCUMENTS

| | | |
|---|---|---|
| EP | 2542407 A1 | 1/2013 |
| WO | 2011/109688 A1 | 9/2011 |
| WO | 2019/126521 A1 | 6/2019 |

OTHER PUBLICATIONS

International Search Report and Written Opinion of the International Searching Authority; PCT/US2020/056433; mailed on Jan. 12, 2021; 12 pages; European Patent Office.

(Continued)

*Primary Examiner* — Mark R Wendell
(74) *Attorney, Agent, or Firm* — Daniel J. Greenhalgh

(57) ABSTRACT

Various embodiments of the disclosure are directed towards fenestration assemblies having a first pane; a second pane, the second pane spaced from the first pane; and a third pane configured in spaced relation between the first pane and the second pane, where the third pane is a laminate. In one aspect, the total thickness of the third pane laminate is not greater than 3 mm. In one aspect, the laminate comprises a first glass layer not greater than 1 mm thick and a second (Continued)

glass layer not greater than 1 mm thick, and an interlayer between first and second layers.

23 Claims, 5 Drawing Sheets

(51) Int. Cl.
    *B32B 17/10*     (2006.01)
    *B32B 27/00*     (2006.01)
    *E06B 3/67*     (2006.01)

(52) U.S. Cl.
    CPC .......... *E06B 3/6707* (2013.01); *E06B 3/6715* (2013.01); *B32B 2255/00* (2013.01); *B32B 2307/102* (2013.01); *B32B 2307/30* (2013.01); *B32B 2307/402* (2013.01); *B32B 2307/732* (2013.01); *B32B 2419/00* (2013.01)

(58) Field of Classification Search
    CPC .......... B32B 2255/00; B32B 2307/102; B32B 2307/30; B32B 2307/402; B32B 2307/732; B32B 2419/00
    USPC ......................................................... 52/200
    See application file for complete search history.

(56) References Cited

U.S. PATENT DOCUMENTS

| | | | |
|---|---|---|---|
| 11,312,658 | B2 | 4/2022 | Bertin-Mourot et al. |
| 2012/0085063 | A1* | 4/2012 | Pufahl ................ E06B 1/62 |
| | | | 428/141 |
| 2014/0157696 | A1* | 6/2014 | Reyher ................ E06B 3/6715 |
| | | | 52/302.1 |
| 2015/0111016 | A1 | 4/2015 | Fisher et al. |
| 2017/0113440 | A1 | 4/2017 | Rickerl et al. |
| 2017/0119176 | A1 | 5/2017 | Christiansen et al. |
| 2018/0215125 | A1 | 8/2018 | Gahagan |
| 2022/0010610 | A1 | 1/2022 | McDonald |
| 2022/0081962 | A1 | 3/2022 | Bertin-Mourot et al. |

OTHER PUBLICATIONS

Millett et al., "Sunlight Responsive Thermochromic Window System", USDOE Office of Energy Efficiency and Renewable Energy (EERE), United States, 2006, 31 pages.

\* cited by examiner

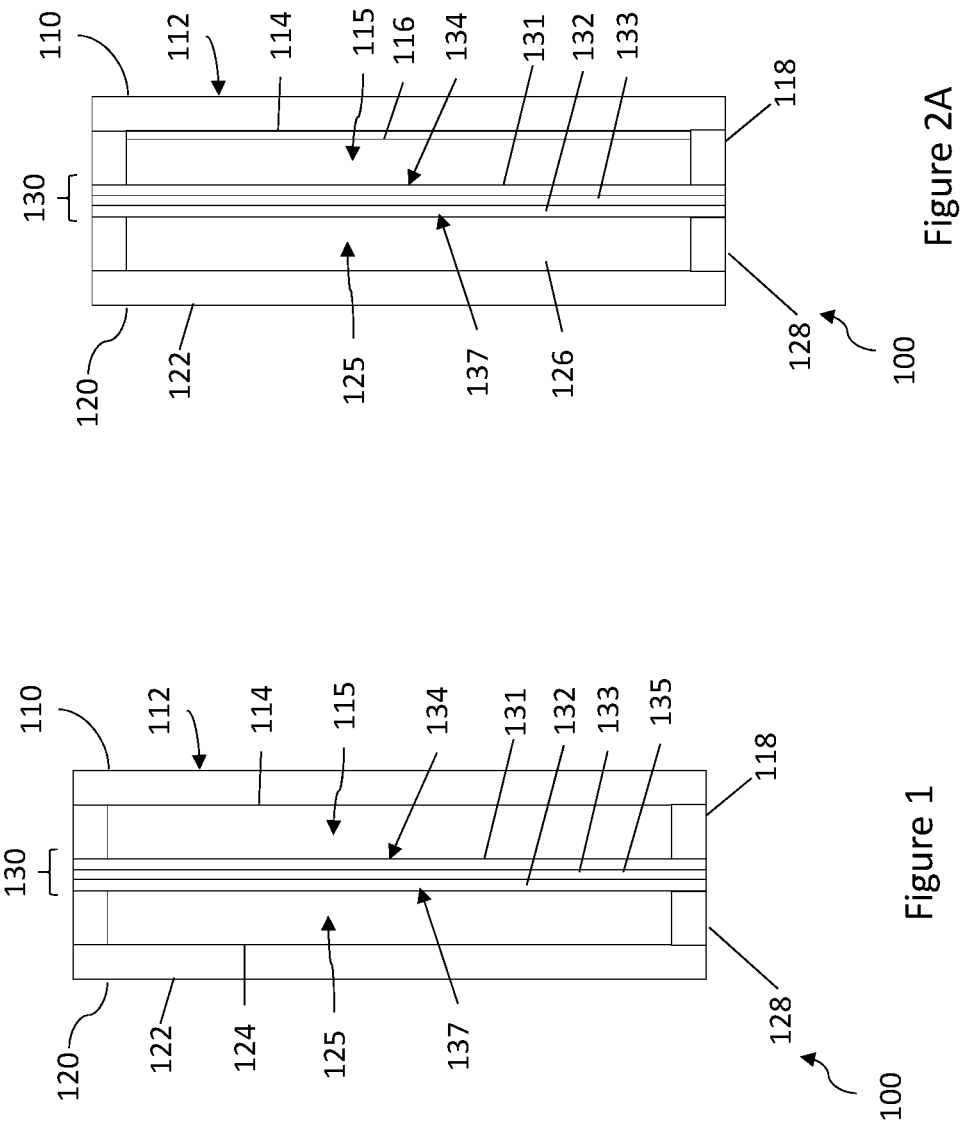

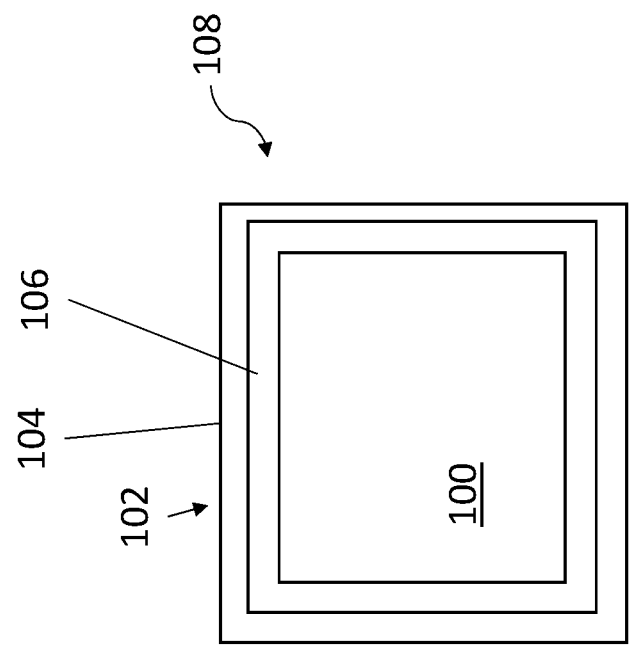
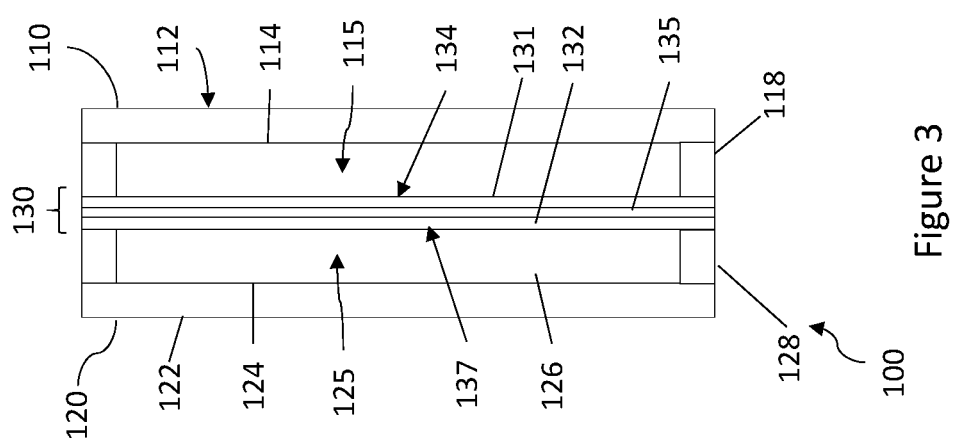

FENESTRATION ASSEMBLIES AND RELATED METHODS

CROSS-REFERENCE TO RELATED APPLICATIONS

This application claims the benefit of priority under 35 U.S.C. § 371 of International Application No. PCT/US2020/056433, filed on Oct. 20, 2020, which claims the benefit of priority under 35 U.S.C. § 119 of U.S. Provisional Application No. 62/923,690, filed Oct. 21, 2019, the content of each of which is incorporated herein by reference in its entirety.

FIELD OF THE DISCLOSURE

Generally, the present disclosure is directed towards embodiments of fenestration assemblies that include tailored triple pane window configurations with desirable characteristics. More specifically, the present disclosure is directed towards embodiments of fenestration assemblies that include triple pane window systems having a third pane (center pane) that is a thin laminate structure.

BACKGROUND

Triple pane windows provide improved performance in areas including: solar heat gain coefficient (SHGC) and insulation (U-values), to name a few. However, the third pane adds weight to the assembly, adds difficulty in handling/installation, and increases thickness of the glazing assembly (i.e. requiring new tooling and/or thicker frame/sash materials), among other complications.

SUMMARY OF THE DISCLOSURE

Generally, the present disclosure is directed towards embodiments of fenestration assemblies that include tailored triple pane windows configurations with desirable characteristics. More specifically, the present disclosure is directed towards embodiments of a fenestration assembly that include insulating glass units, configured as triple pane window systems having a third pane (e.g. center pane) that is a thin laminate structure (e.g. when compared to the outer panes (e.g. first pane and second pane; and/or existing triple pane windows).

In some embodiments, a fenestration assembly is provided which includes a triple pane assembly, where the third pane (center pane) comprises a laminate (e.g. thin laminate structure).

In some embodiments, a fenestration assembly including a triple pane assembly (e.g. insulating glass unit) is provided, wherein the third pane (center pane) is a laminate, wherein, via the laminate, the fenestration assembly is configured as a safety window.

In some embodiments, a fenestration assembly including a triple pane assembly (e.g. insulating glass unit) is provided, wherein the third pane (center pane) is a laminate, wherein, via the laminate (and/or laminate configuration), the fenestration assembly is configured to provide acoustic dampening. In some embodiments, triple pane assemblies (e.g. windows) with a center pane laminate have shown improved acoustic performance (as measured by standard metrics such as ASTM E413, ASTM E1332, and ISO 717-1).

In some embodiments, the fenestration assembly includes a triple pane assembly (e.g. insulating glass unit), wherein the third pane (center pane) is configured with a dyed or tinted interlayer in the laminate to provide a tinted fenestration assembly.

In one aspect, a fenestration assembly is provided, comprising: a first pane; a second pane, the second pane configured in a spaced relation (e.g. and generally in parallel alignment) with the first pane; and a third pane configured in spaced relation between the first pane and the second pane, the third pane comprises a laminate (e.g. and generally parallel alignment with the first pane and the second pane), wherein the laminate thickness is less than 3 mm.

In another aspect, a fenestration assembly is provided, comprising: a first pane; a second pane, the second pane configured in a spaced relation (e.g. and generally in parallel alignment) with the first pane; and a third pane configured in spaced relation between the first pane and the second pane, the third pane comprising a laminate, wherein the laminate thickness is less than 3 mm, further wherein the laminate comprises: a first glass layer having a thickness of not greater than 1 mm; a second glass layer having a thickness of not greater than 1 mm; and an interlayer configured between the first glass layer and the second glass layer (e.g. wherein the interlayer bonds the first layer to the second layer); wherein, via the third pane, the fenestration assembly is configured as a safety glazing in accordance with ANSI Z97.1 or EN 12600 standards, when measured in accordance with the standard; further wherein, the fenestration assembly comprises a weighted sound reduction metric $R_w$ of at least 35 dB, when measured in accordance with ISO 717-1 standard.

In another aspect, a fenestration assembly is provided, comprising: an insulating glazing unit, comprising: a first pane; a second pane, the second pane configured in a spaced relation with the first pane; and a third pane configured in spaced relation between the first pane and the second pane, the third pane comprising a laminate, wherein the laminate thickness is less than 3 mm; and a sealing member, configured with sealing engagement to the insulating glazing unit, to define: via the first pane, the third pane, and the frame, a first defined gap; and via the second pane, the third pane, and the frame, a second defined gap.

In another aspect, a fenestration assembly is provided, comprising: a first pane; a second pane, the second pane configured in a spaced relation with the first pane; and a third pane configured in spaced relation between the first pane and the second pane, the third pane comprises a laminate.

In another aspect, a fenestration assembly is provided, comprising: a first pane; a second pane, the second pane configured in a spaced relation with the first pane; and a third pane configured in spaced relation between the first pane and the second pane, the third pane comprises a laminate, wherein the laminate thickness is less than 4.5 mm.

In one embodiment, the laminate thickness is less than 2.5 mm.

In one embodiment, the laminate comprises: a first glass layer having a thickness of not greater than 1 mm; a second glass layer having a thickness of not greater than 1 mm; and an interlayer configured between the first and second layer (e.g. where the interlayer bonds the first layer to the second layer).

In some embodiments, a fenestration assembly is provided, comprising: a first pane; a second pane, the second pane configured in a spaced relation with the first pane; and a third pane configured in spaced relation between the first pane and the second pane, the third pane comprises a laminate, wherein the laminate thickness is not greater than 4.3 mm (e.g. glass layers each having thickness of 1 mm, with interlayer having thickness of 2.3 mm (e.g. 2.28 mm).

In one embodiment, the laminate comprises a low emissivity coating on at least one of: a first major surface of the first glass layer, a second major surface of the second glass layer, and combinations thereof.

For example, the low emissivity coating can be comprised of a combination of metals and oxides, including non-limiting examples of: silicon nitride, metallic silver, silicon dioxide, tin oxide, zirconium oxide, and/or combinations thereof, to name a few.

In one embodiment, at least one of the first glass layer and the second glass layer of the laminate has a low coefficient of thermal expansion (CTE). As used herein, CTE refers to the coefficient of thermal expansion of an identified glass composition, or of a glass sheet or pane comprised thereof, as measured over a temperature range of 0-300° C., when measured in accordance with ASTM E228 or equivalent standard.

In one embodiment, the first glass layer and the second glass layer of the laminate have a coefficient of thermal expansion (CTE) over a temperature range 0-300° C. less than $7 \times 10^{-6}$/K.

In one embodiment, at least one of the first glass layer and the second glass layer of the laminate have a CTE of less than $7 \times 10^{-6}$/K; less than $6.5 \times 10^{-6}$/K; less than $6 \times 10^{-6}$/K; less than $5.5 \times 10^{-6}$/K; less than $5 \times 10^{-6}$/K; less than $4.5 \times 10^{-6}$/K; less than $4 \times 10^{-6}$/K; less than $3.5 \times 10^{-6}$/K; or less than $3 \times 10^{-6}$/K over a temperature range 0-300° C.

In one embodiment, at least one of the first glass layer and the second glass layer of the laminate have a CTE of greater than $2.5 \times 10^{-6}$/K; greater than $3 \times 10^{-6}$/K; less than $3.5 \times 10^{-6}$/K; greater than $4 \times 10^{-6}$/K; greater than $4.5 \times 10^{-6}$/K; greater than $5 \times 10^{-6}$/K; greater than $5.5 \times 10^{-6}$/K; greater than $6 \times 10^{-6}$/K; or greater than $6.5 \times 10^{-6}$/K over a temperature range 0-300° C.

In one embodiment, at least one of the first glass layer and the second glass layer of the laminate have a CTE of between $2.5 \times 10^{-6}$/K and $7 \times 10^{-6}$/K; or between $3 \times 10^{-6}$/K and $6.5 \times 10^{-6}$/K, or between $2.5 \times 10^{-6}$/K and $6 \times 10^{-6}$/K.

In one embodiment, the first glass layer and second glass layer of the laminate comprise: a soda lime silicate glass layer; alumina borosilicate glass layer; an alkaline earth boro-aluminosilicate glass; or an alkali-free boro-aluminosilicate glass.

In one embodiment, the first glass layer comprises a soda lime silicate glass layer and the second glass layer comprises an alumina borosilicate glass layer.

In one embodiment, the thickness of the fenestration assembly is not greater than 35 mm.

In one embodiment, the fenestration assembly further comprises an insulating glass unit (IGU).

In one embodiment, the fenestration assembly is: a window, a door, a skylight, a curtain wall, and/or combinations thereof.

In one embodiment, the first pane and second pane are selected from the types of glass consisting of: a soda lime silicate glass; alumina borosilicate glass layer; an alkaline earth boro-aluminosilicate glass; and an alkali-free boro-aluminosilicate glass.

In one embodiment, the first pane and the second pane are composed of the same type of glass.

In one embodiment, the first pane and the second pane are composed of different types of glass.

In one embodiment, a low emissivity coating is configured on the first surface of the first pane.

In one embodiment, the interlayer comprises a polymer.

In one embodiment, the interlayer is an acoustic dampening polymer configured for noise reduction.

For example, the acoustic dampening polymer can be configured with multiple (e.g. 3 layers of polymer) with one layer (i.e. a central or middle layer in 3-layer polymer example) configured of a soft polymer compared to the other interlayer polymer layers. A commercially available example of an acoustic dampening polymer is QS 41 (by Solutia, a Subsidiary of Eastman Chemical Company).

In one embodiment, the interlayer is a tinted polymer configured for light absorption.

In various embodiments, the tinted polymer is configurable to absorb at least some UV light, infra-red light, visible light, and/or combinations thereof.

In some embodiments, a first defined gap is configured between the first pane and the third pane; and a second defined gap is configured between the second pane and the third pane.

In one embodiment, the first defined gap and the second defined gap are filled with non-reactive gas (e.g. configured to promote better thermal performance).

Non-limiting examples of gas in the first or second defined gap include: inert gas (e.g. Kr, Ar), air, and mixtures thereof, to name a few. In some embodiments, at least one of first defined gap and second defined gap are configured with a vacuum. In some embodiments, the fenestration assembly is configured to enable gas to communicate between the first defined gap and the second defined gap by areas including, but not limited to: tailored regions in the spacer and/or third pane that are configured to permit gas to permeate and/or communicate between the first defined gap and second defined gap region(s) (i.e. to promote dissipation/normalization of pressure differentials; to reduce, prevent, and/or eliminate bowing in the fenestration assembly; to dissipate moisture so as to reduce, prevent, and/or eliminate moisture/fog in the first defined gap and/or second defined gap, among other drivers).

In one embodiment, the fenestration assembly passes a safety test as set out in ANSI Z97.1 standard, when measured in accordance with the standard.

In one embodiment, the fenestration assembly comprises a weighted noise reduction metric $R_w$ of at least 35 dB, when measured in accordance with ISO 717-1 standard.

In one embodiment, the interlayer of the third pane is not greater than 2.3 mm.

In one embodiment, at least one of the first pane, the second pane, the first glass layer of the third pane, and the second glass layer of the third pane is a chemically strengthened glass.

In one embodiment, the fenestration assembly includes at least one sealing member configured to cooperate with the first pane, the second pane, and the third pane to provide sealing engagement across the fenestration assembly, wherein: via the first pane, the third pane, and the at least one sealing member, a first defined gap is defined; and via the second pane, the third pane, and the at least one sealing member, a second defined gap is defined.

In one embodiment, the sealing member comprises a frame.

In one embodiment, the sealing member comprises a spacer.

In one embodiment, the spacer is metal, plastic, or a combination thereof.

In one embodiment, the spacer includes an adhesive, configured to adhere to both the glass surfaces (e.g. first pane and third pane or second pane and third pane).

In one embodiment, the spacer is configured to fit between (or onto and end of each of) the first pane and the third pane and define the first defined gap therein.

In one embodiment, the spacer is configured to fit between (or onto and end of each of) the second pane and third pane and define the second defined gap therein.

In one embodiment, the spacer includes a desiccant, configured therein. For example, the desiccant is configured to reduce, prevent and/or eliminate presence of moisture (e.g. fog) in the first defined gap and/or second defined gap.

In some embodiments, the laminate thickness range is at least 0.5 mm to not greater than 4.4 mm. In some embodiments, the laminate thickness range is at least 0.75 mm to not greater than 3.5 mm. In some embodiments, the laminate thickness range is at least 0.75 mm to not greater than 3 mm. In some embodiments, the laminate thickness range is at least 1 mm to not greater than 2.75 mm.

In some embodiments, the laminate thickness is not greater than 4.5 mm; not greater than 4 mm; not greater than 3.5 mm; not greater than 3 mm; not greater than 2.5 mm; not greater than 2 mm; not greater than 1.5 mm; not greater than 1 mm; or not greater than 0.5 mm.

In some embodiments, the laminate thickness is at least 4 mm; at least 3.5 mm; at least 3 mm; at least 2.5 mm; at least 2 mm; at least 1.5 mm; at least 1 mm; or at least 0.5 mm.

In some embodiments, the intermediate layer thickness is at least 0.3 mm to not greater than 2.4 mm. In some embodiments, the intermediate layer thickness is at least 0.5 mm to not greater than 2. mm.

In some embodiments, the intermediate layer thickness is at least 0.75 mm to not greater than 2 mm. In some embodiments, the intermediate layer thickness is at least 0.5 mm to not greater than 1 mm. In some embodiments, the intermediate layer thickness is at least 0.75 mm to not greater than 1.5 mm.

In one embodiment, the third pane comprise a first glass layer having a thickness of 0.5 mm, a second glass layer having a thickness of 0.5 mm, and an intermediate layer thickness of 0.3 mm. In one embodiment, the third pane comprise a first glass layer having a thickness of 0.5 mm, a second glass layer having a thickness of 0.5 mm, and an intermediate layer thickness of 0.6 mm.

In one embodiment, the fenestration assembly thickness is not greater than 40 mm. In one embodiment, the fenestration assembly thickness is not greater than 35 mm. In one embodiment, the fenestration assembly thickness is not greater than 30 mm.

In some embodiments, the laminate is configured of two fusion glass layers, where the glass layers may be EAGLE XG®; Gorilla Glass®, Lotus™ among others commercially available from Corning Incorporated. In some embodiments, the first pane is a float glass or a fusion glass. In some embodiments, the second pane is a float glass or a fusion glass.

In some embodiments, the third pane has a lower thickness than the first pane. In some embodiments, the third pane has a lower thickness than the second pane. In some embodiments, the third pane has a lower thickness than either of the first pane and the second pane.

In one embodiment, the first pane has a thickness of not greater than 6 mm. In one embodiment, the first pane has a thickness of 3 mm.

In some embodiments, the first pane has a thickness of not greater than 12 mm; not greater than 10 mm; not greater than 8 mm; not greater than 6 mm; not greater than 4 mm; or not greater than 3 mm. In some embodiments, the first pane has a thickness of less than 12 mm; less than 10 mm less than 8 mm; less than 6 mm; less than 4 mm; or less than 3 mm. In some embodiments, the first pane has a thickness of between 3 and 12 mm; or between 4 and 10 mm; or between 6 and 8 mm; or between 3 and 6 mm.

In one embodiment, the second pane has a thickness of not greater than 6 mm. In one embodiment, the first pane has a thickness of 3 mm.

In some embodiments, the second pane has a thickness of not greater than 12 mm; not greater than 10 mm; not greater than 8 mm; not greater than 6 mm; not greater than 4 mm; or not greater than 3 mm. In some embodiments, the second pane has a thickness of less than 12 mm; less than 10 mm less than 8 mm; less than 6 mm; less than 4 mm; or less than 3 mm. In some embodiments, the second pane has a thickness of between 3 and 12 mm; or between 4 and 10 mm; or between 6 and 8 mm; or between 3 and 6 mm.

In some embodiments, thicknesses of first pane and second pane supplement each other to promote tailored performance for particular parameters while minimizing weight of an IGU or window assembly (e.g. if thicker first pane, then thinner second pane) and/or maximizing the volume of gas (e.g. defined gap distance between panes). In some embodiments, the distance between panes (e.g. length of a first and/or second defined gap) is configured at between 10-16 mm (e.g. for argon enclosed gaps) or between 8-12 mm (e.g. for other gases and/or gaseous mixtures in the first and second defined gaps).

In some embodiments, the third pane has a lower CTE than the first pane. In some embodiments, the third pane has a lower CTE than the second pane. In some embodiments, the third pane has a lower CTE than either of the first pane and the second pane.

In another aspect of the present disclosure, a method is provided, comprising: aligning a first pane, a second pane, a third pane in a spaced arrangement, wherein the third pane comprising a laminate not greater than 3 mm, wherein the third pane is configured between the first pane and the second pane; engaging the first pane, the second pane, and the third pane with at least one sealing member to retain the first pane, the second pane, and the third pane in sealing engagement; and concomitant with the engaging step, providing a triple pane assembly configured with a first defined gap between the first pane, the third pane, the sealing member and a second defined gap between the second pane, the third pane, and the sealing member.

In some embodiments, the method includes: replacing at least some gas in at least one of: the first defined gap and the second defined gap with a non-reactive gas or gas mixture (e.g. non-reactive and configured to promote thermal insulation across the fenestration assembly).

In some embodiments, the replacing step includes: actuating a valve (e.g. configured in the sealing member) to output an initial gas from at least one of the first defined gap and the second defined gap and input a non-reactive gas into at least one of the first defined gap and the second defined gap. For example, the valve is configurable to enable displacement of at least some of the existing gas (ambient air entrapped during engagement of the sealing member) with a non-reactive gas or gas mixture specifically configured for window gap usage.

In another aspect, a method of retrofitting a window assembly, comprising: removing a window assembly from a surface (e.g. wall, ceiling, floor) to define an opening; installing a fenestration assembly comprising a triple pane assembly having a thin laminate not exceeding 3 mm as a third pane (e.g. center pane); and improving, via the installing step, at least one window performance criterion (when comparing the fenestration assembly to the window assembly).

In some embodiments, the performance criterion includes at least one of: acoustic dampening (e.g. improved/reduced sound transmittance through the fenestration assembly); safety performance (e.g. in compliance with safety rating or improved/reduced weight with thin center pane and in compliance with safety rating); improved/reduced solar heat gain coefficient (e.g. reduced; improved/reduced weight; maintained cross-sectional assembly thickness (i.e. e.g. total thickness (assembly width) of first pane, first defined gap, third pane, second defined gap, and second pane); reduced cross-sectional thickness (i.e. total thickness (assembly width) of first pane, first defined gap, third pane, second defined gap, and second pane); emissivity (e.g. improved/reduced emissivity with application or one or more low emissivity coatings); insulation (e.g. improved/reduced thermal transfer (hot or cold) from one end of the fenestration assembly to the other end, through the cross-sectional width); light transmittance (improved/reduced light transmittance and/or improved filtering of one or more types of light); and/or combinations thereof.

In some embodiments, the installing step includes: inserting the fenestration assembly into the opening; and incorporating mounting materials (e.g. frame, sash, and other conventional installation materials) to retain the fenestration assembly in the surface.

One or more of the aforementioned fenestration assembly embodiments are utilizable with one or more of the aforementioned methods set forth herein.

Additional features and advantages will be set forth in the detailed description which follows and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which:

FIG. 1 depicts a schematic cut away side view of an embodiment of a fenestration assembly, in accordance with an embodiment of the present disclosure.

FIG. 2A-2E depict schematic cut away side views of various embodiments of fenestration assemblies having low emissivity coatings on one or more areas of the assembly, in accordance with the present disclosure.

FIG. 2A depicts a schematic cut away side view of an embodiment of a fenestration assembly having a low emissivity coating applied onto: an inner surface of first pane, in accordance with the present disclosure.

FIG. 2B depicts a schematic cut away side view of an embodiment of a fenestration assembly having a low emissivity coating applied onto: an inner surface of the second pane and an inner surface of the first pane, in accordance with the present disclosure.

FIG. 2C depicts a schematic cut away side view of an embodiment of a fenestration assembly having a low emissivity coating applied onto: an inner surface of the second pane and a major surface of the first glass layer of the third pane laminate, in accordance with the present disclosure.

FIG. 2D depicts a schematic cut away side view of an embodiment of a fenestration assembly having a low emissivity coating applied onto: an inner surface of the first pane and a major surface of the first glass layer of the third pane laminate, in accordance with the present disclosure.

FIG. 2E depicts a schematic cut away side view of an embodiment of a fenestration assembly having a low emissivity coating on a second major surface of the second glass layer of the third pane and a low emissivity coating on a second major surface of the second glass layer of the third pane, in accordance with the present disclosure.

FIG. 3 depicts a schematic cut away side view of an embodiment of a fenestration assembly in which the interlayer of the third pane laminate is a tinted interlayer, configured to absorb light (e.g. UV, infrared, and/or visible light) in accordance with the present disclosure.

FIG. 4 depicts a diagram of a fenestration assembly including an insulating glazing unit (IGU) and frame, in accordance with the present disclosure.

DETAILED DESCRIPTION

Figure 2E:
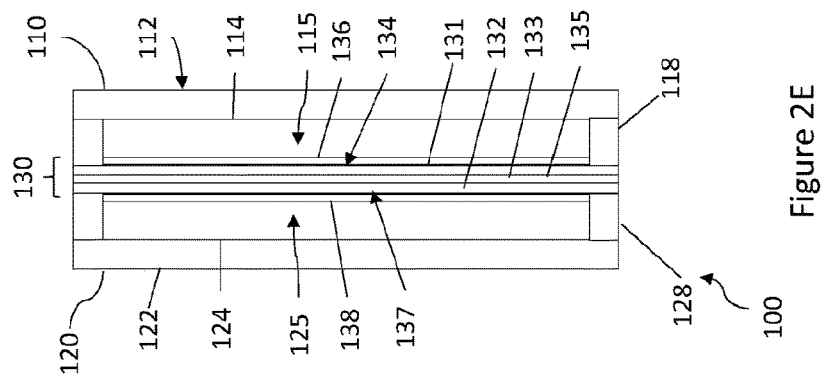

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Referring to FIGS. 1-3, schematic cut away side views of various embodiments of a fenestration assembly are depicted. As depicted, the fenestration assembly 100 generally comprises a triple pane assembly (e.g. insulating glass unit assembly). The fenestration assembly generally includes three panes: a first pane 110, a second pane 120, and a third pane 130.

The third pane 130 comprises a laminate configuration, including: a first glass layer 131, a second glass layer 132, and interlayer 133 positioned between the first glass layer 131 and the second glass layer 132 to form a unitary laminate structure. The third pane 130 laminate has a corresponding major surface of the first layer of glass 134 and a major surface of the second layer of glass 137 in opposing configuration.

The first pane 110 comprises an outer surface 112 and an inner surface 114.

The second pane 120 comprises an outer surface 122 and an inner surface 124.

As shown, the third pane 130 is positioned between the first pane 110 and the second pane 120, in spaced relation from both the first pane 110 and the second pane 120. More specifically the inner surface 114 of the first pane 110 is facing the major surface of the first glass layer 134 or the third pane 130 and the inner surface 124 of the second pane 120 is facing the major surface of the second glass layer 137 of the third pane.

The first pane 110, the second pane 120, and third pane 130 are retained in spaced relation from each other via at least one sealing member 102. The sealing member(s) 102 are positioned towards the ends (perimetrical edge) of each of the corresponding panes 110, 120, and 130, such that at least one seal is created inside the fenestration assembly. For example, a first defined gap 115 is defined via the sealing member 102, first pane 110 and third pane 130 (e.g. major surface of the first glass layer 134). Additionally, a second defined gap 125 is defined via the sealing member 102, second pane 120 and third pane 130 (e.g. major surface of the second glass layer 137). In some embodiments, the corresponding gas pressure in first defined gap 115 and second defined gap 125 are be the same or different.

In some embodiments, the sealing member 102 comprises a plurality (i.e. 2 or more) sealing members. In some embodiments, sealing member 102 can be configured as one or more spacer 106 and/or frame 104.

In some embodiments, the sealing member 102 includes two sealing members 118 and 128, each configured to fit between two panes. For example, a first sealing member 118 is configured proximal to the respective perimetrical edges and/or ends of the first pane 110 and third pane 130 and a second sealing member 128 is configured proximal to the respective perimetrical edges and/or ends of the second pane 120 and third pane 130. In this configuration, a frame 104 is utilized to cooperate with the first pane 110, corresponding sealing members 102 (here 118 and 128), second pane 120, and third pane 130 to provide sealing engagement, thus retaining the panes 110, 120, and 130 in spaced relation and enclosing gas in (1) the first defined gap 115 between first pane 110 and third pane 130 and in (2) the second defined gap 125 between second pane 120 and third pane 130.

FIG. 2A-2E show various embodiments of the fenestration assembly 100 having a low emissivity coating 126 on one or more areas or components of the assembly 100.

In the embodiment shown in FIG. 2A, the fenestration assembly 100 includes a low emissivity coating 116 on an inner surface 114 of the first pane 110.

Figure 2D:
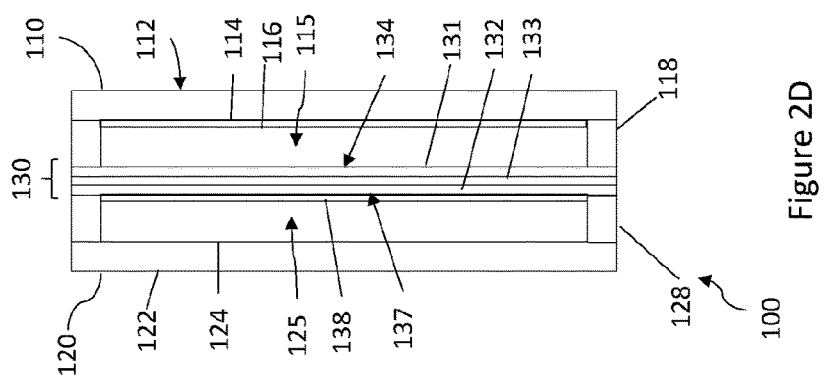
Figure 2C:
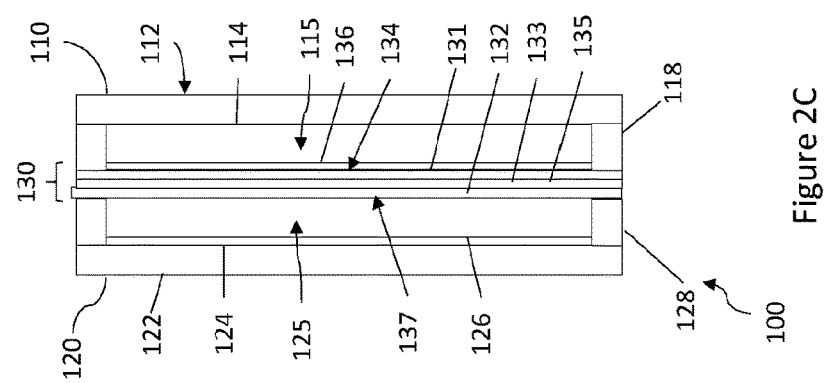
Figure 2B:
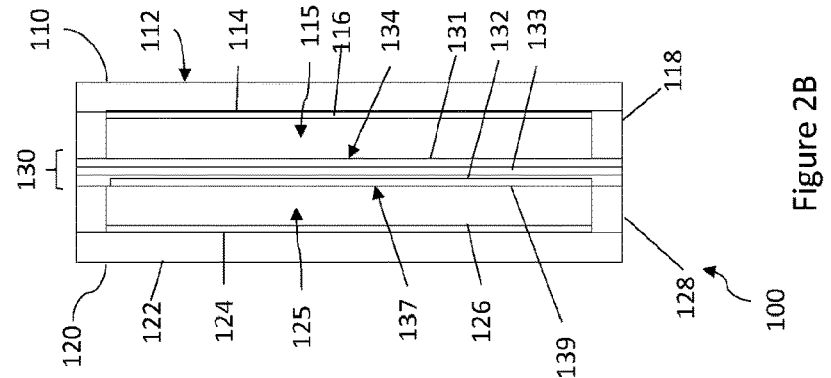

In the embodiment shown in FIG. 2B, the fenestration assembly 100 includes a low emissivity coating 126 on an inner surface 124 of the second pane 120 and a low emissivity coating on the inner surface of the first pane 110. In some embodiments, the third pane is configured with surface features (shown as 139 in FIG. 2B). Non-limiting examples of surface features include bulk scattering patterns, among others.

In the embodiment shown in FIG. 2C, the fenestration assembly 100 includes a Low emissivity coating 126 on an inner surface 124 of the second pane 120 and a low emissivity coating 136 on the major surface 134 of the first glass layer 131 of the third pane 130.

In the embodiment shown in FIG. 2D, the fenestration assembly 100 includes a low emissivity coating 116 on an inner surface 114 of the first pane 110 and a low emissivity coating 138 on a second major surface 137 of the second glass layer 132 of the third pane 130.

In the embodiment shown in FIG. 2E, the fenestration assembly 100 includes a low emissivity coating 138 on a second major surface 137 of the second glass layer 132 of the third pane 130 and a low emissivity coating 136 on a second major surface 134 of the second glass layer 131 of the third pane 130.

Referring to FIG. 3, the third pane 130 can be configured with a tinted interlayer 135 (e.g. polymeric interlayer including a tint and/or dye), such that the corresponding third pane 130, and thus, the fenestration assembly 100 is configured to absorb at least a portion of at least one of: UV light, infrared light, visible light, and/or combinations thereof.

Referring to FIG. 4, a triple pane assembly 108 is generally depicted, which includes a fenestration assembly 100 configured within a sealing member 102, which comprises a frame 104 and a spacer 106.

Figure 5:
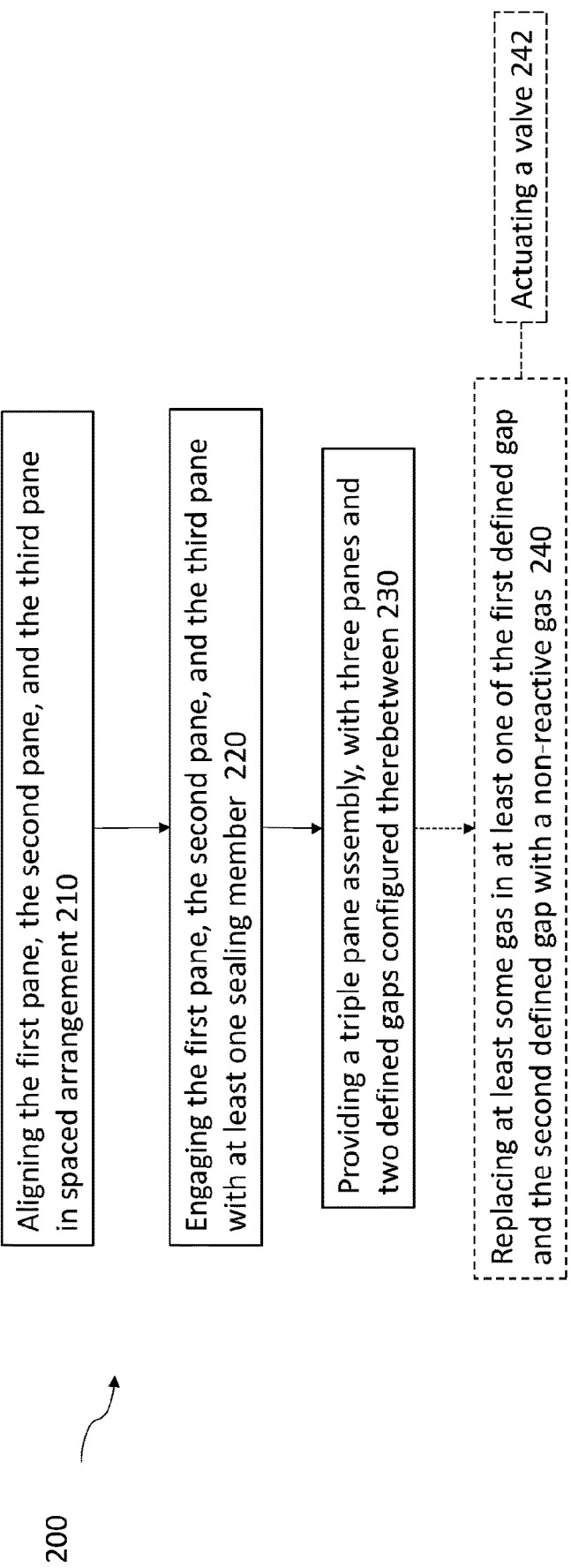
FIG. 5 is a flow chart depicting an embodiment of a method of assembling a fenestration assembly, in accordance with the present disclosure.

Referring to FIG. 5, a flow chart depicting a method of assembling a fenestration assembly 200 is provided. This method includes any of the described embodiments of fenestration assemblies which include a triple pane assembly with a third pane laminate structure (e.g. central, thin laminate). The method 200 includes: aligning 210 a first pane, a second pane, a third pane in a spaced arrangement (e.g. wherein the third pane comprising a laminate not greater than 3 mm, wherein the third pane is configured between the first pane and the second pane); engaging 220 the first pane, the second pane, and the third pane with at least one sealing member to retain the first pane, the second pane, and the third pane in sealing engagement; and concomitant with the engaging step, providing a triple pane assembly 230 configured with a first defined gap between the first pane, the third pane, the sealing member and a second defined gap between the second pane, the third pane, and the sealing member. In some embodiments, the method includes (set out as optional in FIG. 5, denoted with dashed lines): replacing 240 at least some gas in at least one of: the first defined gap and the second defined gap with (1) a non-reactive gas or (2) gas mixture (e.g. non-reactive and configured to promote thermal insulation across the fenestration assembly).

In some embodiments, the replacing step includes: actuating 242 a valve (e.g. configured in the sealing member) to output an initial gas from at least one of the first defined gap and the second defined gap and input a non-reactive gas into at least one of the first defined gap and the second defined gap. For example, the valve is configurable to enable displacement of at least some of the existing gas (ambient air entrapped during engagement of the sealing member) with a non-reactive gas or gas mixture specifically configured for window gap usage.

Figure 6:
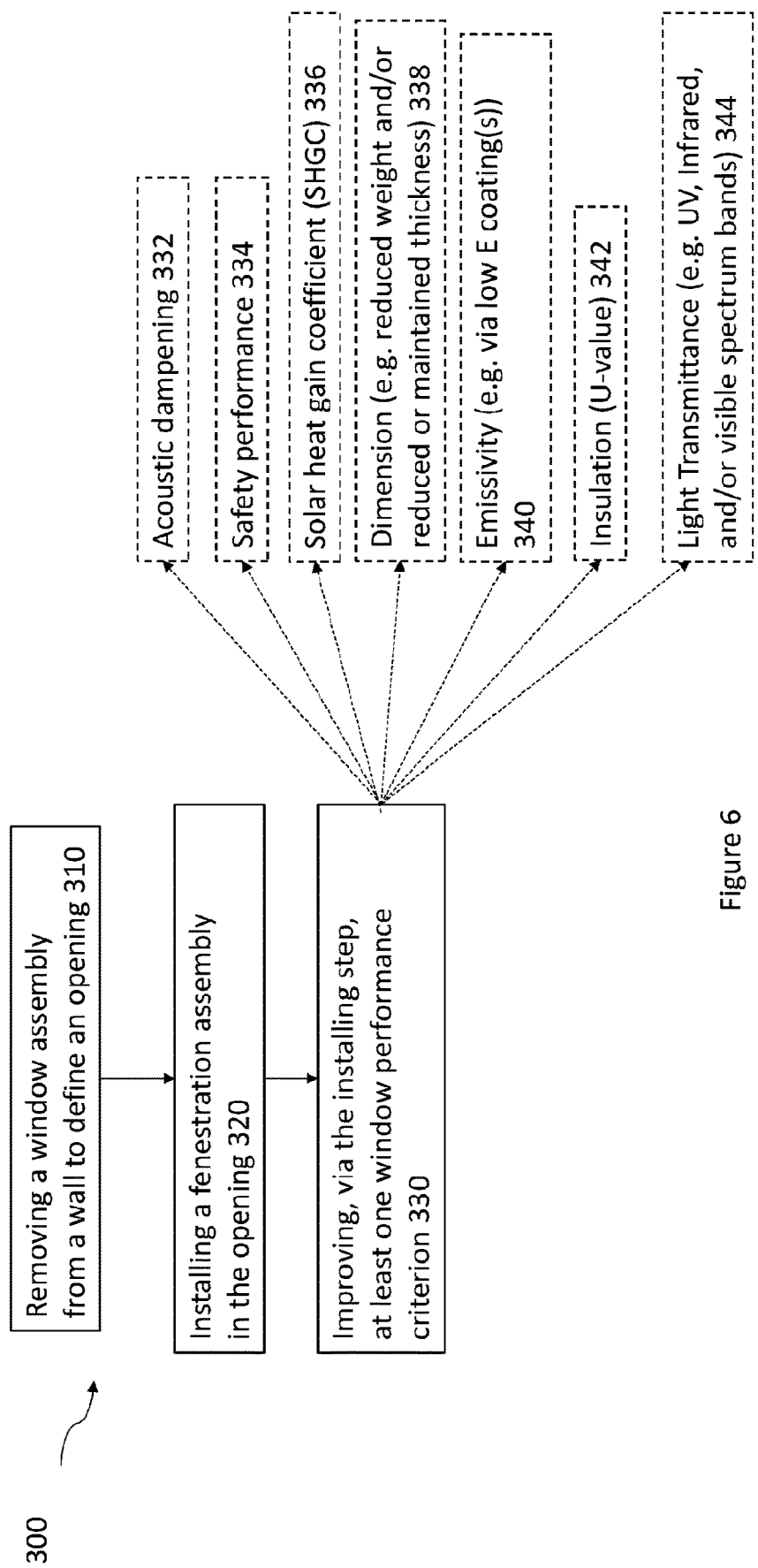
FIG. 6 is a flow chart depicting an embodiment of a method of retrofitting a building with a fenestration assembly, in accordance with the present disclosure.

Referring to FIG. 6, an embodiment of a method of retrofitting a surface (e.g. wall, floor, ceiling, and/or combinations thereof) with a fenestration assembly is shown. This method includes any of the described embodiments of fenestration assemblies which include a triple pane assembly with a third pane laminate structure (e.g. central, thin laminate). As shown, a method of retrofitting a window assembly 300 includes the steps of: removing 310 a window assembly from a surface (e.g. wall, ceiling, floor) to define an opening; installing 320 a fenestration assembly comprising a triple pane assembly having a laminate (e.g. not exceeding 3 mm as a third pane and/or center pane); and concomitant with the installing step, improving 330, via the installing step, at least one window performance criterion (e.g. when comparing the fenestration assembly window performance criterion to the window assembly performance criterion).

Non-limiting examples of window performance criterion include at least one of: acoustic dampening 332 (e.g. improved/reduced sound transmittance through the fenestration assembly); safety performance 334 (e.g. in compliance with safety rating or improved/reduced weight with thin center pane and in compliance with safety rating); improved/reduced solar heat gain coefficient 336; improved dimensions 338 (e.g. reduced weight and/or reduced or maintained cross-sectional thickness); emissivity 340 (e.g. improved/reduced emissivity with application or one or more low emissivity coatings); insulation 342 (e.g. improved/reduced thermal transfer (hot or cold) from one end of the fenestration assembly to the other end, through the cross-sectional width); light transmittance 344 (improved/reduced light transmittance and/or improved filtering of one or more types of light); modular drop-in configuration (e.g. present embodiment having same dimensional configuration as existing window, with minimal need for window mounting re-work in instances of retrofitting); and/or combinations thereof. In some embodiments, the installing step includes: inserting the fenestration assembly into the opening; and incorporating mounting materials (e.g. frame, sash, and other conventional installation materials) to retain the fenestration assembly in the surface.

In some embodiments, the low emissivity coatings are configured to provide an improved Solar heat gain coefficient and/or U-value. In some embodiments, solar heat gain coefficient is quantified and/or measured in accordance with ANSI/NFRC 200-2017_E0A1 Procedure for Determining Fenestration Product Solar Heat Gain Coefficient and Visible Transmittance at Normal Incidence. In some embodiments, thermal insulation (U-value) is quantified and/or measured in accordance with ASTM E1423-14 Standard Practice for Determining Steady State Thermal Transmittance of Fenestration Systems and/or ANSI/NFRC 100-2017_E0A2 Procedure for Determining Fenestration Product U-factors.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. As a non-limiting example, about means less than 10% of the referenced value.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Example: Computer Model Illustrative of Configuration vs. Performance

Computer modeling was completed to evaluate the difference in acoustic performance for various triple pane window assemblies, including two embodiments of the present disclosure and 3 comparative examples. Commercially available INSUL software was utilized to model several configurations of insulating glazing unit design, with comparative results (e.g. total thickness, total weight, sound reduction, and safety rating) set forth herein. A standard 3 mm soda lime glass was utilized for each of the first pane and second pane and a standard defined gap of 12.7 mm was used for the first defined gap and the second defined gap.

For comparative example 1, the third pane was a single layer of soda lime glass having a thickness of 3 mm.

For comparative example 2, the third pane was a single layer of soda lime glass having a thickness of 1 mm.

For comparative example 3, the third pane was a single layer of soda lime glass having a thickness of 0.7 mm.

For Embodiment A, the laminate has a first glass layer thickness of 0.5 mm, an interlayer (PVB) thickness of 0.76 mm, and a second glass layer thickness of 0.5 mm.

For Embodiment B, the laminate has a first glass layer thickness of 1 mm, an interlayer (PVB) thickness of 0.76 mm, and a second glass layer thickness of 1 mm.

Table 1, below, compares several criteria (non-limiting examples of window performance criterion) of the modeled assemblies, including: Total Assembly Thickness (i.e. first pane+first defined gap+third pane+second defined gap+second pane); assembly weight; acoustic dampening; and safety glazing of third pane (Y/N/Maybe). Safety glazing is generally defined as either (a) a single piece of thermally tempered glass, or (b) a laminate, which meets the requirements specified in safety regulations (e.g. including ANSI Z97.1 and/or EN 12600) as a pane which is either (a) a single piece of thermally tempered glass, or (b) a laminate.

TABLE 1

| Sample Name | Total Thickness (mm) | Weight (kg/m²) | Rw (dB) | Safety glazing in third pane? |
|---|---|---|---|---|
| Comparative Example 1 | 34.4 | 22.5 | 36 | Maybe* |
| Comparative Example 2 | 32.4 | 17.5 | 35 | No |
| Comparative Example 3 | 32.1 | 16.8 | 35 | No |
| Embodiment A | 33.2 | 14.3 | 36 | Yes |
| Embodiment B | 34.2 | 16.3 | 36 | Yes |

*To qualify as safety glazing a single piece of soda lime glass is thermally tempered to meet the requirements specified in ANSI Z97.1 or EN 12600. This is generally not possible for glass thicknesses below 2 mm.

As shown above with respect to the Comparative Examples, when the soda lime glass third pane is thinned (from 3 mm to 1 mm to 0.7 mm), the corresponding $R_w$ values go down, meaning the window assembly has lower noise reduction capabilities, when measured in accordance with ISO 717-1 standard.

The laminate panes of Embodiment A and Embodiment B provide higher $R_w$ values than the single piece of glass with equivalent glass thickness. Additionally, Embodiment A and Embodiment B are safety glazings, in contrast with the soda lime glass of corresponding thickness (e.g. comparative example 2 and comparative example 3) which is not. As shown here, for safety glazings in the third pane, Embodiment A and Embodiment B provide significant weight reductions and consistent performance in noise reduction metric (i.e. as measured in accordance with ISO 717-1 standard), when compared to the soda lime safety glazing Comparative Example 1. Also, it is noted that the model did not build in the interlayer of the laminate, which is believed to offer additional acoustic performance (e.g. noise dampening) when compared to the configurations of Comparative Examples 1-3.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A fenestration assembly, comprising:
   a first pane;
   a second pane, the second pane configured in a spaced relation with the first pane; and
   a third pane configured in spaced relation between the first pane and the second pane, the third pane comprises a laminate, wherein the laminate thickness is less than 4.3 mm,
   wherein the laminate comprises:
      a first glass layer having a thickness of not greater than 1 mm;
      a second glass layer having a thickness of not greater than 1 mm; and
      an interlayer configured between the first and second layer.

2. The fenestration assembly of claim 1, wherein the laminate thickness is less than 3 mm.

3. The fenestration assembly of claim 1, wherein the laminate comprises a low emissivity coating on at least one of: a first major surface of the first glass layer, a second major surface of the second glass layer, and combinations thereof.

4. The fenestration assembly of claim 1, wherein at least one of the first glass layer and the second glass layer of the laminate has a low coefficient of thermal expansion (CTE).

5. The fenestration assembly of claim 4, wherein the first glass layer and the second glass layer of the laminate have a coefficient of thermal expansion less than $7 \times 10^{-6}$/K.

6. The fenestration assembly of claim 1, wherein the first glass layer and second glass layer of the laminate comprise:
   a. a soda lime silicate glass;
   b. alumina borosilicate glass;
   c. an alkali-aluminosilicate glass
   d. an alkaline earth boro-aluminosilicate glass; or
   e. an alkali-free boro-aluminosilicate glass.

7. The fenestration assembly of claim 6, wherein the first glass layer comprises a soda lime silicate glass layer and the second glass layer comprises an alumina borosilicate glass layer.

8. The fenestration assembly of claim 1, wherein the thickness of the fenestration assembly is not greater than 35 mm.

9. The fenestration assembly of claim 1, wherein the fenestration assembly further comprises an insulating glass unit (IGU).

10. The fenestration assembly of claim 1, further comprising a window, a door, a skylight, a curtain wall, and/or combinations thereof.

11. The fenestration assembly of claim 1, wherein the first pane and second pane are selected from the types of glass consisting of:
   a. a soda lime silicate glass;
   b. alumina borosilicate glass;
   c. alkali-aluminosilicate glass
   d. an alkaline earth boro-aluminosilicate glass; and
   e. an alkali-free boro-aluminosilicate glass.

12. The fenestration assembly of claim 1, wherein the first pane and the second pane are composed of the same type of glass.

13. The fenestration assembly of claim 1, wherein the first pane and the second pane are composed of different types of glass.

14. The fenestration assembly of claim 1, further comprising a low emissivity coating on the first surface of the first pane.

15. The fenestration assembly of claim 1, wherein the interlayer comprises a polymer.

16. The fenestration assembly of claim 1, wherein the interlayer is an acoustic dampening polymer configured for noise reduction.

17. The fenestration assembly of claim 1, wherein the interlayer is a tinted polymer configured for light absorption.

18. The fenestration assembly of claim 1, further comprising:
   a first defined gap between the first pane and the third pane; and
   a second defined gap between the second pane and the third pane.

19. The fenestration assembly of claim 1, wherein the first defined gap and the second defined gap are filled with non-reactive gas.

20. The fenestration assembly of claim 1, wherein the fenestration assembly passes a safety test as set out in at least one of: ANSI Z97.1 and EN 12600 standard, when measured in accordance with the standard.

21. The fenestration assembly of claim 1, wherein the fenestration assembly comprises a weighted noise reduction metric $R_w$ of at least 35 dB, when measured in accordance with ISO 717-1 standard.

22. The fenestration assembly of claim 1, wherein the interlayer of the third pane is not greater than 2.3 mm.

23. The fenestration assembly of claim 1, wherein the laminate thickness is greater than 2 mm.

* * * * *